United States Patent
Chenguttuvan et al.

(10) Patent No.: US 11,539,529 B2
(45) Date of Patent: Dec. 27, 2022

(54) SYSTEM AND METHOD FOR FACILITATING OF AN INTERNET OF THINGS INFRASTRUCTURE FOR AN APPLICATION

(71) Applicant: Wipro Limited, Bangalore (IN)

(72) Inventors: Gopinath Chenguttuvan, Chennai (IN); Vaishali Rajakumari T., Chennai (IN); Swamynathan Ramalingam, Kancheepuram (IN)

(73) Assignee: Wipro Limited, Bangalore (IN)

( * ) Notice: Subject to any disclaimer, the term of this patent is extended or adjusted under 35 U.S.C. 154(b) by 336 days.

(21) Appl. No.: 16/992,414

(22) Filed: Aug. 13, 2020

(65) Prior Publication Data

US 2021/0375491 A1 Dec. 2, 2021

(30) Foreign Application Priority Data

May 27, 2020 (IN) .............................. 202041022232

(51) Int. Cl.
| | |
|---|---|
| *H04L 9/32* | (2006.01) |
| *G16Y 20/10* | (2020.01) |
| *G16Y 40/50* | (2020.01) |
| *G16Y 40/20* | (2020.01) |

(52) U.S. Cl.
CPC ............ *H04L 9/3239* (2013.01); *G16Y 20/10* (2020.01); *G16Y 40/20* (2020.01); *G16Y 40/50* (2020.01)

(58) Field of Classification Search
CPC ......... G16Y 20/10; G16Y 40/50; G16Y 40/20
USPC .......................................................... 700/90
See application file for complete search history.

(56) References Cited

U.S. PATENT DOCUMENTS

| | | | |
|---|---|---|---|
| 10,049,335 B1* | 8/2018 | Narkier | G06Q 10/0637 |
| 10,262,019 B1* | 4/2019 | Reiner | H04L 67/10 |
| 10,580,301 B2* | 3/2020 | Anvari | G01S 13/933 |
| 10,764,374 B1* | 9/2020 | Marquardt | G06Q 20/40155 |
| 11,005,582 B1* | 5/2021 | Anvari | H04W 72/005 |
| 11,052,851 B1* | 7/2021 | Anvari | G16H 10/60 |
| 11,257,242 B2* | 2/2022 | Das | G05D 1/0214 |

(Continued)

FOREIGN PATENT DOCUMENTS

| | | |
|---|---|---|
| CN | 106899468 A | 6/2017 |
| EP | 3028066 A1 | 6/2016 |
| KR | 20170059546 A | 5/2017 |

*Primary Examiner* — Tauqir Hussain
(74) *Attorney, Agent, or Firm* — Finnegan, Henderson, Farabow, Garrett & Dunner, LLP

(57) ABSTRACT

The disclosure relates to system and method for facilitating designing of an Internet of Things (IoT) infrastructure for deploying an IoT application. The method includes determining a Manhattan distance between each of a plurality of existing requirements and a new requirement, identifying one or more of the plurality of existing requirements corresponding to a minimum Manhattan distance, determining a relevancy score for each of the one or more identified existing requirements based on a similarity between the each of the one or more identified existing requirements and the new requirement, and providing one or more IoT components and one or more IoT designs corresponding to a similar existing requirement for facilitating designing of the IoT infrastructure. The similar existing requirement comprises one of the one or more identified existing requirement with a maximum relevancy score.

15 Claims, 8 Drawing Sheets

(56) References Cited

U.S. PATENT DOCUMENTS

| | | | |
|---|---|---|---|
| 11,388,191 B1* | 7/2022 | Anvari | H04L 63/1466 |
| 11,391,599 B1* | 7/2022 | Anvari | G01C 21/3691 |
| 11,436,074 B2* | 9/2022 | Dubey | G06F 11/079 |
| 2015/0029880 A1* | 1/2015 | Burns | H04L 41/0876 370/252 |
| 2018/0063250 A1* | 3/2018 | Justin | G06F 11/3058 |
| 2018/0084073 A1* | 3/2018 | Walsh | G16Y 40/35 |
| 2018/0191867 A1* | 7/2018 | Siebel | H04L 69/40 |
| 2018/0212768 A1* | 7/2018 | Kawashima | H04L 63/0876 |
| 2019/0020718 A1* | 1/2019 | Mathews | H04L 67/55 |
| 2019/0073286 A1* | 3/2019 | Kambaloor | G06F 11/3428 |
| 2019/0171438 A1* | 6/2019 | Franchitti | G06N 20/00 |
| 2019/0278777 A1* | 9/2019 | Malik | G06F 16/24578 |
| 2019/0356556 A1* | 11/2019 | Vicat-Blanc | G06F 30/20 |
| 2019/0363905 A1* | 11/2019 | Yarvis | G06F 9/5066 |
| 2020/0050494 A1* | 2/2020 | Bartfai-Walcott | G06F 9/5083 |
| 2020/0152340 A1* | 5/2020 | Anvari | G16Y 20/10 |
| 2020/0285645 A1* | 9/2020 | Sandstrom | G06N 20/00 |
| 2020/0311586 A1* | 10/2020 | Sandstrom | G06N 7/005 |
| 2020/0334312 A1* | 10/2020 | Yang | G06K 9/6231 |
| 2020/0394455 A1* | 12/2020 | Lee | G06K 9/6259 |
| 2021/0051438 A1* | 2/2021 | Satheesh Kumar | H04W 4/70 |
| 2021/0209813 A1* | 7/2021 | Hur | G06T 9/001 |
| 2021/0215787 A1* | 7/2021 | Anvari | G01S 13/765 |
| 2021/0243346 A1* | 8/2021 | Bhatia | G06V 10/82 |
| 2021/0300344 A1* | 9/2021 | Anvari | G01S 13/86 |
| 2021/0306424 A1* | 9/2021 | Anvari | H04L 67/12 |
| 2021/0350061 A1* | 11/2021 | Sreenivasan | H01L 25/0657 |
| 2022/0006482 A1* | 1/2022 | He | H04L 69/22 |
| 2022/0068492 A1* | 3/2022 | Friedmann | G16H 10/60 |
| 2022/0198245 A1* | 6/2022 | Cleland | G06N 3/049 |

* cited by examiner

| Existing Requirements 501 | Device 502 | Connectivity 503 | Gateway 504 | Cloud 505 | Analytics 506 |
|---|---|---|---|---|---|
| IoT infrastructure for air pollution detection, monitoring and alert | Sensor 1 | Bluetooth | Raspberry PI | AWS | AWS IOT |
| IoT infrastructure for water pollution detection, monitoring | Sensor 2 | Wi-Fi | DELL Edge | IBM WATSON | TABLEAU |
| IoT infrastructure to recognize speech, analyze and alert for threat | Sensor 3 | Bluetooth | ADLINK | Google Cloud | Things Board |
| IoT infrastructure for humidity and its analysis and alert | Sensor 4 | Wi-Fi | GATEWAY4 | AWS | Splashboard |
| IoT infrastructure for humidity, gas detection and its analysis and | Sensor 5 | NFC | ADLINK | Google Cloud | Power B |
| IoT infrastructure for passive infrared | Sensor 6 | ZIGBEE | DELL Edge | Azure | Power B |
| IoT infrastructure for high volume water quality sensor data | Sensor 7 | Wi-Fi | Gateway6 | CISCOIOT | Things Board |
| IoT infrastructure for gas, water detection | Sensor 8 | ZIGBEE | Raspberry PI | AWS | AWS IOT |
| IoT infrastructure for Chemical sensor | Sensor 9 | NFC | Gateway7 | CISCOIOT | TABLEAU |
| IoT infrastructure for Motion Detection Sensor monitoring | Sensor 10 | NFC | GATEWAY4 | CISCOIOT | Things Board |

FIG. 5

| Tokenized IoT Requirements 601 | | | | Device, and connectivity etc. 602 | Manhattan Distance with respect to new requirement 603 |
|---|---|---|---|---|---|
| IoT infrastructure | Air, Pollution, Detection | Monitoring | Alert | Sensor 1 | 2 |
| IoT infrastructure | Gas. Pollution, Detection | Monitoring | Alert | Sensor 2 | 3 |
| IoT infrastructure | Recognize, Speech | Analyze | Alert | Sensor 3 | 4 |
| IoT infrastructure | Humidity | Analysis | | Sensor 4 | 4 |
| IoT infrastructure | Humidity | Gas detection | Analysis | Sensor 5 | 2 |
| IoT infrastructure | Passive | Infrared | Analysis | Sensor 6 | 4 |
| IoT infrastructure | High volume | Water | Quality | Sensor 7 | 4 |
| IoT infrastructure | Gas | Water | Detection | Sensor 8 | 2 |
| IoT infrastructure | Chemical | Sensor | | Sensor 9 | 4 |
| IoT infrastructure | Motion | Detection | Sensor | Sensor 10 | 3 |

FIG . 6

| | Tokenized IoT Requirements | | | | Manhattan Distance |
|---|---|---|---|---|---|
| IoT infrastructure | Air, Pollution, Humidity | Monitoring | Alert | Sensor 1 | 2 |
| IoT infrastructure | Humidity | Gas detection | Analysis | Sensor 5 | 2 |
| IoT infrastructure | Gas | Water | Detection | Sensor 8 | 2 |
| IoT infrastructure | Gas leakage | Detection | monitoring | TBD | |

FIG. 7

| Req.No. | IoT infrastructure | Humidity | Gas | Detection | Analysis | Air | Leakage | Pollution | Alert | Water | Monitoring |
|---|---|---|---|---|---|---|---|---|---|---|---|
| REQ 1 | 1 | 0 | 0 | 1 | 0 | 1 | 0 | 1 | 1 | 0 | 1 |
| REQ 2 | 1 | 1 | 1 | 1 | 1 | 0 | 0 | 0 | 0 | 0 | 0 |
| REQ 3 | 1 | 0 | 1 | 1 | 0 | 0 | 0 | 0 | 0 | 1 | 0 |
| REQ 4 | 1 | 0 | 1 | 1 | 0 | 0 | 1 | 0 | 0 | 0 | 1 |

FIG. 8

SYSTEM AND METHOD FOR FACILITATING OF AN INTERNET OF THINGS INFRASTRUCTURE FOR AN APPLICATION

TECHNICAL FIELD

The present disclosure relates generally to Internet of Things (IoT), and more particularly to system and method for facilitating designing of an IoT infrastructure for deploying an IoT application.

BACKGROUND

Internet of Things (IoT) is an interconnection of computing devices embedded in everyday objects or things, thereby enabling them to send and receive data and, therefore, allowing them to interact in a physical world. For example, in case of proximity detection, two IoT devices may be employed that may interact with each other. One of the two IoT device may emit an audio along with a data packet. and another IoT device may detects the audio and the data packet. Based on a correlation between the detected audio and the data packet a distance between the two IoT devices may be calculated. To design an IoT infrastructure a large number of IoT components may be required to be evaluated and/or processed. The plurality of IoT components may include physical devices, sensors, data extraction techniques, secured communication techniques, IoT gateways, cloud servers, analytics and dashboards.

Various systems are available to provide assistance while designing the IoT infrastructure. Typically, existing techniques allow for passive and manual selection of IoT components while designing the IoT infrastructure. However, such manual activity consumes a lot of time. Further, a wide array of IoT components are available in the market and understanding of all these IoT components are impossible which leads to delay and incorrect processing of the IoT components. It is therefore desirable to address the aforementioned issues and to provide an improved and efficient technique and for designing an IoT Infrastructure for deployment of an IoT application

SUMMARY

In one embodiment, a method of facilitating designing of an Internet of Things (IoT) infrastructure for deploying an IoT application is disclosed. In one example, the method may include determining a Manhattan distance between each of a plurality of existing requirements and a new requirement. The new requirement may be with respect to the IoT infrastructure for deploying the IoT application. The method may further include identifying one or more of the plurality of existing requirements corresponding to a minimum Manhattan distance. The method may further include determining a relevancy score for each of the one or more identified existing requirements based on a similarity between the each of the one or more identified existing requirements and the new requirement. The method may further include providing one or more IoT components and one or more IoT designs corresponding to a similar existing requirement for facilitating designing of the IoT infrastructure. The similar existing requirement may include one of the one or more identified existing requirement with a maximum relevancy score.

In another embodiment, a system for facilitating designing of an IoT infrastructure for deploying an IoT application is disclosed. In one example, the system may include a processor and a memory communicatively coupled to the processor. The memory may store processor-executable instructions, which, on execution, may causes the processor to determine a Manhattan distance between each of a plurality of existing requirements and a new requirement. The new requirement may be with respect to the IoT infrastructure for deploying the IoT application The processor-executable instructions, on execution, may further cause the processor to identify one or more of the plurality of existing requirements corresponding to a minimum Manhattan distance. The processor-executable instructions, on execution, may further cause the processor to determine a relevancy score for each of the one or more identified existing requirements based on a similarity between the each of the one or more identified existing requirements and the new requirement. The processor-executable instructions, on execution, may further cause the processor to provide one or more IoT components and one or more IoT designs corresponding to a similar existing requirement for facilitating designing of the IoT infrastructure. The similar existing requirement may include one of the one or more identified existing requirement with a maximum relevancy score.

In yet another embodiment, a non-transitory computer-readable medium storing computer-executable instruction for facilitating designing of an IoT infrastructure for deploying an IoT application is disclosed. In one example, the stored instructions, when executed by a processor, may cause the processor to perform operations including determining a Manhattan distance between each of a plurality of existing requirements and a new requirement. The new requirement may be with respect to the IoT infrastructure for deploying the IoT application. The operations may further include identifying one or more of the plurality of existing requirements corresponding to a minimum Manhattan distance. The operations may further include determining a relevancy score for each of the one or more identified existing requirements based on a similarity between the each of the one or more identified existing requirements and the new requirement. The operations may further include providing one or more IoT components and one or more IoT designs corresponding to a similar existing requirement for facilitating designing of the IoT infrastructure. The similar existing requirement may include one of the one or more identified existing requirement with a maximum relevancy score.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5 is a table representing a plurality existing requirements and corresponding plurality of IoT design components, in accordance with some embodiments of the present disclosure.

FIG. 6 is a table representing Manhattan distances corresponding to a plurality of existing requirements with respect to a new requirement, in accordance with some embodiments of the present disclosure.

FIG. 7 is a table representing tokenized existing requirements with minimum Manhattan distance, in accordance with some embodiments of the present disclosure.

FIG. 8 is a table representing binary vectors corresponding to tokenized existing requirements, in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
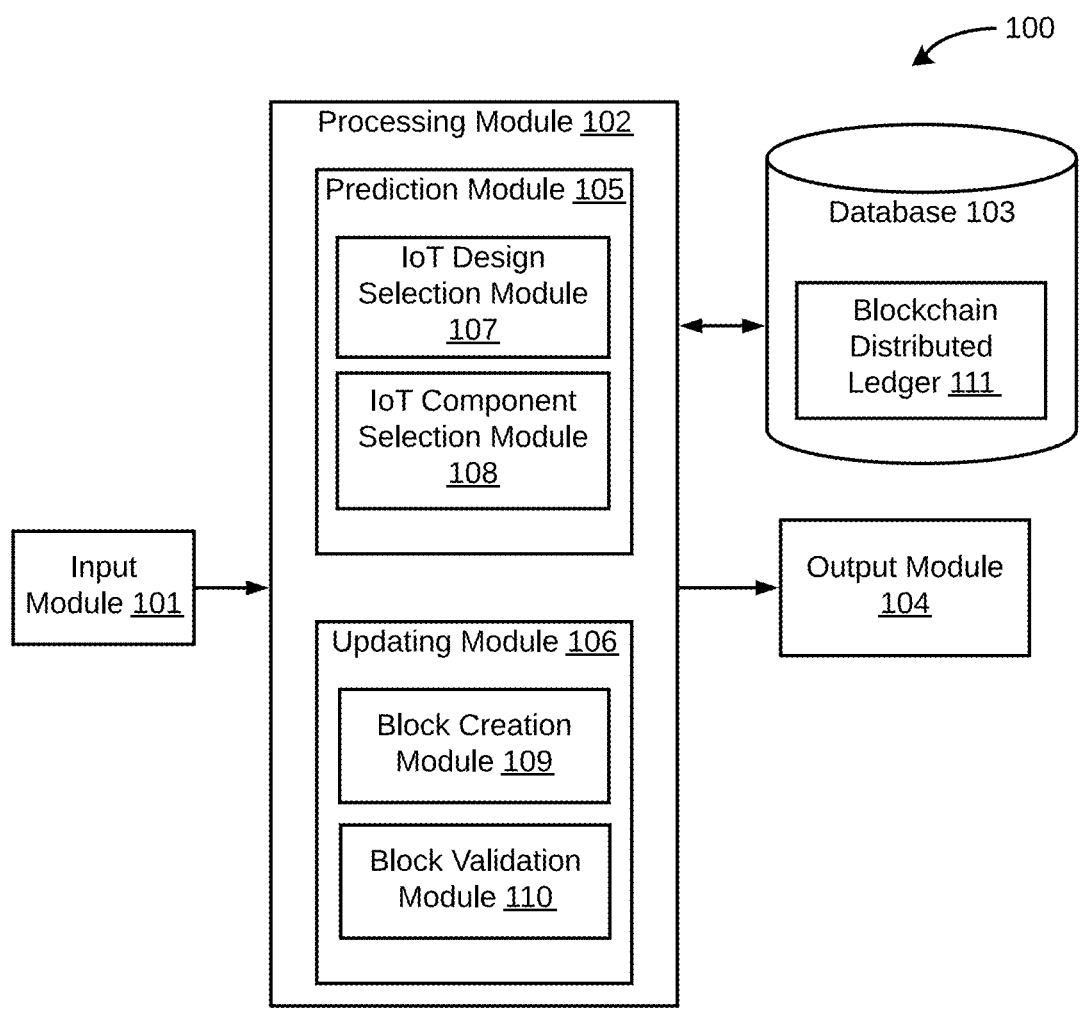
FIG. 1 is a functional block diagram of an exemplary system for facilitating designing of an Internet of Things (IoT) infrastructure for deploying an IoT application, in accordance with some embodiments of the present disclosure.

Referring now to FIG. 1, a functional block diagram of an exemplary system 100 for facilitating designing of an Internet of Things (IoT) infrastructure is illustrated, in accordance with some embodiments of the present disclosure. The IoT infrastructure need to be designed for deploying an IoT application. The system 100 includes an input module 101, a processing module 102, a database 103, and an output module 104. As will be discussed in greater detail below, in some embodiments, the one or more modules 101-104 may be hosted on a processing device. The processing module 102 may include a prediction module 105 and an updating module 106. The prediction module 105 and the updating module 106 may further include various modules to perform different operations so as to facilitate designing of the IoT infrastructure. In particular, the prediction module 105 includes an IoT design selection module 107 and an IoT component selection module 108. In some embodiments, the database 103 may be a blockchain distribution ledger 111. In such embodiments, the updating module 106 may include a block creation module 109 and a block validation module 110.

The input module 101 may fetch a plurality of user requirements through a user device. It should be noted that a user requirement may correspond to a new requirement. The plurality of user requirements may include one or more tasks to be performed, an amount of dataflow required, and a load handling capacity required. In some embodiments, the user device may be a phone, a computer, a laptop device, or the like. Further, the input module 101 may transmit the plurality of user requirements to the connected processing module 102.

As stated above, the processing module 102 may be hosted on the processing device. For example, the processing device may be a server. In some embodiments, the processing module 102 may be hosted on a local server. In some other embodiments, the processing module 102 may be hosted on a remote server. A connectivity between the input module 101 and the processing module 102 may be established via at least one of a Wi-Fi, a Bluetooth connection, mobile data, or the like.

The prediction module 105 of the processing module 102 may be configured to receive the plurality of user requirements from the input module 101. The prediction module 105 may be connected to the database 104. In some embodiments, the database 104 may include the blockchain distributed ledger 111. As will be appreciated, the blockchain distributed ledger 111 may be managed over a peer to peer network, where a plurality of computer devices may be connected to each other via internet connection. The prediction module 105 is configured to store and/or retrieve a plurality of historical IoT design components as well as a plurality of historical IoT designs in and/or from the database 103 (e.g., blockchain distributed ledger 111). In some embodiments, the plurality of historical IoT design components may include a plurality of device components, a plurality of gateway components, a plurality of cloud platform components, and a plurality of analytic components.

Further, the plurality of device components may include sensors, actuators, detectors, or the like. The plurality of gateway components may include raspberry pi, Eurotech, ad link, dell edge, or the like. The plurality of cloud components may include amazon web services, Microsoft azure and the like. Examples of the plurality of analytic components may be a tableau, power bi and the like.

In some embodiments, the blockchain distributed ledger 111 may also store a cryptographic wallet, that includes a plurality of encryption protocols. The cryptographic wallet may be stored in order to securely store the plurality of IoT design components. It should be noted that the cryptographic wallet enables the users to access the peer-to-peer network on which the blockchain distributed ledger 111 is being managed.

The IoT design selection module 107 of the prediction module 105 may be configured to compute a Manhattan distance. The Manhattan distance may be computed between each of a plurality of existing requirements and the new requirement. In some embodiments, the plurality of existing requirements and the new requirement may be tokenized so as to determine relevancy between each of the plurality of existing requirements and the new requirement. The IoT design selection module 107 may be configured to select one or more tokenized existing requirements with minimum Manhattan distance with respect to the new requirement. The IoT design selection module 107 may convert all the selected tokenized existing requirements (i.e., tokenized existing requirements with minimum Manhattan distance) and the tokenized new requirement into corresponding binary vectors. It should be noted that for each token may be assigned a binary value (i.e., '0' or '1') to form binary vectors. The conversion may be done to identify an appropriate IoT design structure.

The IoT design selection module 107 may further calculate relevancy scores for identified existing requirements based on the converted binary vectors. In some embodiments, the IoT design selection module 107 may calculate the relevancy score of an identified existing requirement based on a cosine similarity between the identified existing requirement and the new requirement. Thereafter, based on the calculated relevancy scores, an IoT design may be selected for the new requirement. In particular, the selected IoT design may correspond to a similar existing requirement. In some embodiments, the similar existing requirement may be one or more identified existing requirement with maximum relevancy score.

The IoT component selection module 108 may select at least one gateway component from a plurality of gateway components based on historical data. The historical data may include the plurality of gateway components that may be employed in past for designing various IoT infrastructures based on at least a corresponding selected device component. It should be noted that, the gateway component may be a component that offer a certain level of security for the network and transmitted data with higher order encryption techniques. The gateway component may act as a middle layer between the device component and a cloud component to protect the system 100 from malicious attacks and unauthorized access.

Also, the IoT component selection module 108 may select at least one cloud component from a plurality of cloud components based historical data. In some embodiments, the historical data may include the plurality of cloud components used in the past for designing the plurality of IoT infrastructures based on at least one corresponding selected gateway component. It may be noted that the cloud component is a component that integrates plurality of devices, sensors, gateways, protocols, data storages, and provides predictive analytics.

Further, the IoT component selection module 108 may be configured to select at least one analytic component from the plurality of analytic components based on historical data. In some embodiments, the historic data may include the plurality of analytic components used in the past for designing the plurality of IoT infrastructures based on at least one corresponding selected cloud component. The analytic component may be a process of converting analog data from plurality of smart devices and sensors into useful insights. That may be further interpreted and used for detailed analysis.

The updating module 106 may be operatively coupled to the prediction module 105. The updating module 106 may be configured to update the database 103 (e.g., blockchain distributed ledger 111) by storing the design of IoT infrastructure corresponding to the new requirement in the database 103 (e.g., blockchain distributed ledger 111). Further, in the embodiments where the database 103 is blockchain distributed ledger 111, the block creation module 109 of the updating module 106 may be configured to create a block for updating the blockchain distributed ledger 111. Additionally, the block creation module 109 may be configured to transmit the created block to a plurality of nodes over the peer-to-peer network. The block validation module 110 of the updating module 106 may enable the plurality of nodes to validate the created block by performing a proof of work. In the current context, the proof of work may be where miners may compete against each other to complete transactions on the network. The block validation module 110 may reward one or more of the plurality of nodes, based on performance of each of the plurality of nodes.

The updating module 106 may update the blockchain distributed ledger 111 by appending the created block to the blockchain distributed ledger 111, upon receiving a reward for the proof of work. In one embodiment, the updating module 106 may be configured to append created block to the blockchain distributed ledger 111 by utilizing a one-way hashing technique. In some embodiment, the updating module 106 may enable a plurality of users to update one or more IoT designs or IoT components in the blockchain distributed ledger 111. It should be noted that the plurality of users may access the blockchain distributed ledger 111 by using cryptographic wallets. The processing module 102 may be further communicatively connected to the output module 104.

The output module 104 may receive the identified IoT design and IoT components from the processing module 102. The output module 104 is configured to provide the identified IoT design and IoT components to the user through the user device. The identified IoT design and IoT components may facilitate designing of the IoT infrastructure with respect to the new requirement.

It should be noted that the processing module 102 may be implemented in programmable hardware devices such as programmable gate arrays, programmable array logic, programmable logic devices, or the like. Alternatively, the processing module 102 may be implemented in software for execution by various types of processors. An identified engine/module of executable code may, for instance, include one or more physical or logical blocks of computer instructions which may, for instance, be organized as an object, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

In some embodiments, some part of system 100 may be easily deployed in any cloud-based servers for access and use as an 'application as a service'. For example, the processing module 102 may be implemented on a cloud-based server and used for facilitating designing of an IoT infrastructure for deploying an IoT application.

As will be appreciated by one skilled in the art, a variety of processes may be employed for facilitating designing of an IoT infrastructure for deploying an IoT application. For example, the exemplary system 100 may facilitate designing of an IoT infrastructure for deploying an IoT application, by the process discussed herein. In particular, as will be appreciated by those of ordinary skill in the art, control logic and/or automated routines for performing the techniques and steps described herein may be implemented by the system 100 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all the processes described herein may be included in the one or more processors on the system 100.

Figure 2:
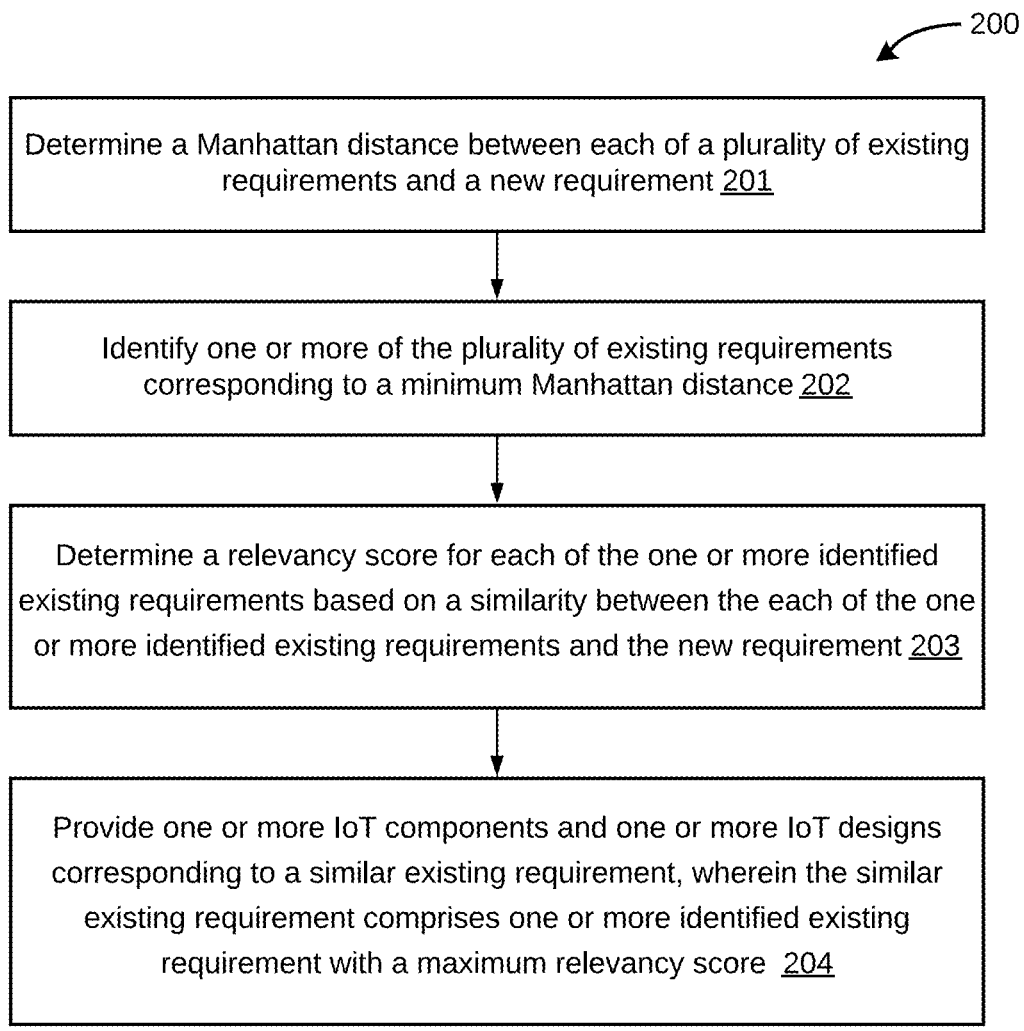
FIG. 2 is a flow diagram of an exemplary process for facilitating designing of an IoT infrastructure for deploying an IoT application, in accordance with some embodiments of the present disclosure.

Referring now to FIG. 2, an exemplary process 200 for facilitating designing of an IoT infrastructure for deploying an IoT application is depicted via a flow chart, in accordance with some embodiments of the present disclosure. Each step of the process 200 may be performed by the processing module 102.

As illustrated in the process 200, at step 201, a Manhattan distance between each of a plurality of existing requirements and a new requirement may be determined. It should be noted that the new requirement may be with respect to the IoT infrastructure for deploying the IoT application. In some embodiments, the new requirement may be received from a user or a system. Additionally, in some embodiments, the new requirement may include at least one of a task to be performed, an amount of dataflow required, and a load handling capacity required. Further, in some embodiments, the plurality of existing requirements may be retrieved from a database. It should be noted that, in some embodiments, the database may be a blockchain distributed ledger. Further, in some embodiments, each of the plurality of existing requirement may be retrieved along with one or more corresponding IoT components and one or more corresponding IoT designs. Moreover, in some embodiments, the plurality of existing requirements may correspond to the new requirement.

In some embodiments, each of the plurality of existing requirements and the new requirement may be tokenized into a corresponding set of tokens. Additionally, in some embodiments, a difference may be computed between the corresponding set of tokens for each of the plurality of existing requirements and the corresponding set of tokens for the new requirement. The Manhattan distance is then determined based on the computed difference.

At step 202, one or more of the plurality of existing requirements may be identified corresponding to a minimum Manhattan distance. At step 203, a relevancy score may be determined for each of the one or more identified existing requirements. The relevancy score may be determined based on a similarity between the each of the one or more identified existing requirements and the new requirement. In some embodiments, each of the one or more identified existing requirements and the new requirement may be converted into respective binary vectors. It should be noted that a total number of attributes in the binary vector may correspond to a total number of tokens in a union of the two or more corresponding set of tokens. Additionally, it should be noted that an attribute of '1' in a binary vector may correspond to a presence of a corresponding token, while an attribute of '0' in the binary vector corresponds to an absence of the corresponding token. Further, in some embodiments, the relevancy score for the each of the one or more identified existing requirements with respect to the new requirement may be determined based on a cosine similarity between the respective binary vectors.

At step 204, one or more IoT components and one or more IoT designs corresponding to a similar existing requirement may be provided to the user or the system for facilitating designing of the IoT infrastructure. It should be noted that the similar existing requirement may include one or more identified existing requirement with a maximum relevancy score. In some embodiments, the database may be updated by storing the new requirement, the one or more IoT components, and the one or more IoT designs for subsequent use. As stated above the database may be a blockchain distributed ledger.

Figure 3:
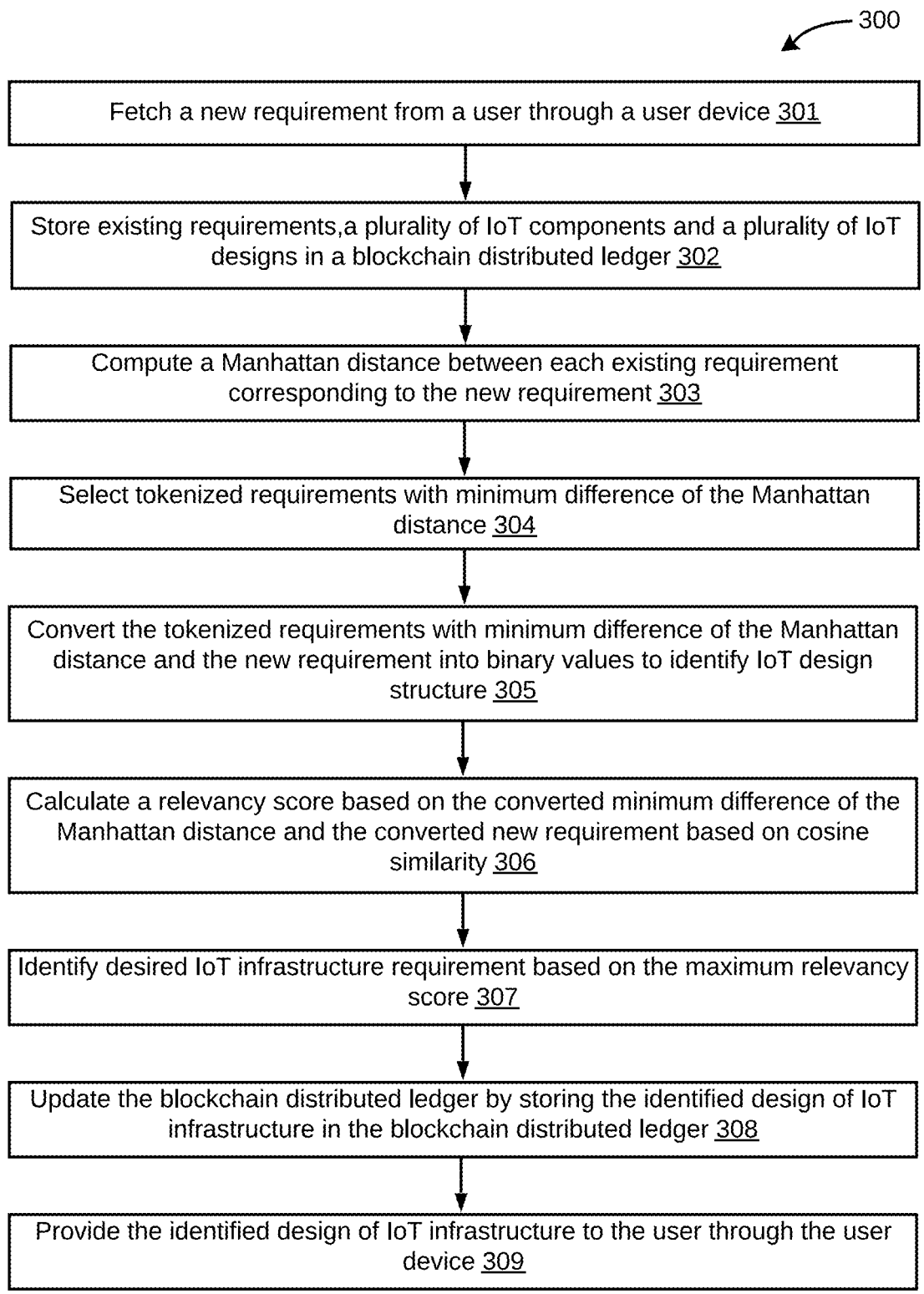
FIG. 3 is a flow diagram of a detailed exemplary process for facilitating designing of an IoT infrastructure for deploying an IoT application, in accordance with some embodiments of the present disclosure.
Figure 4:
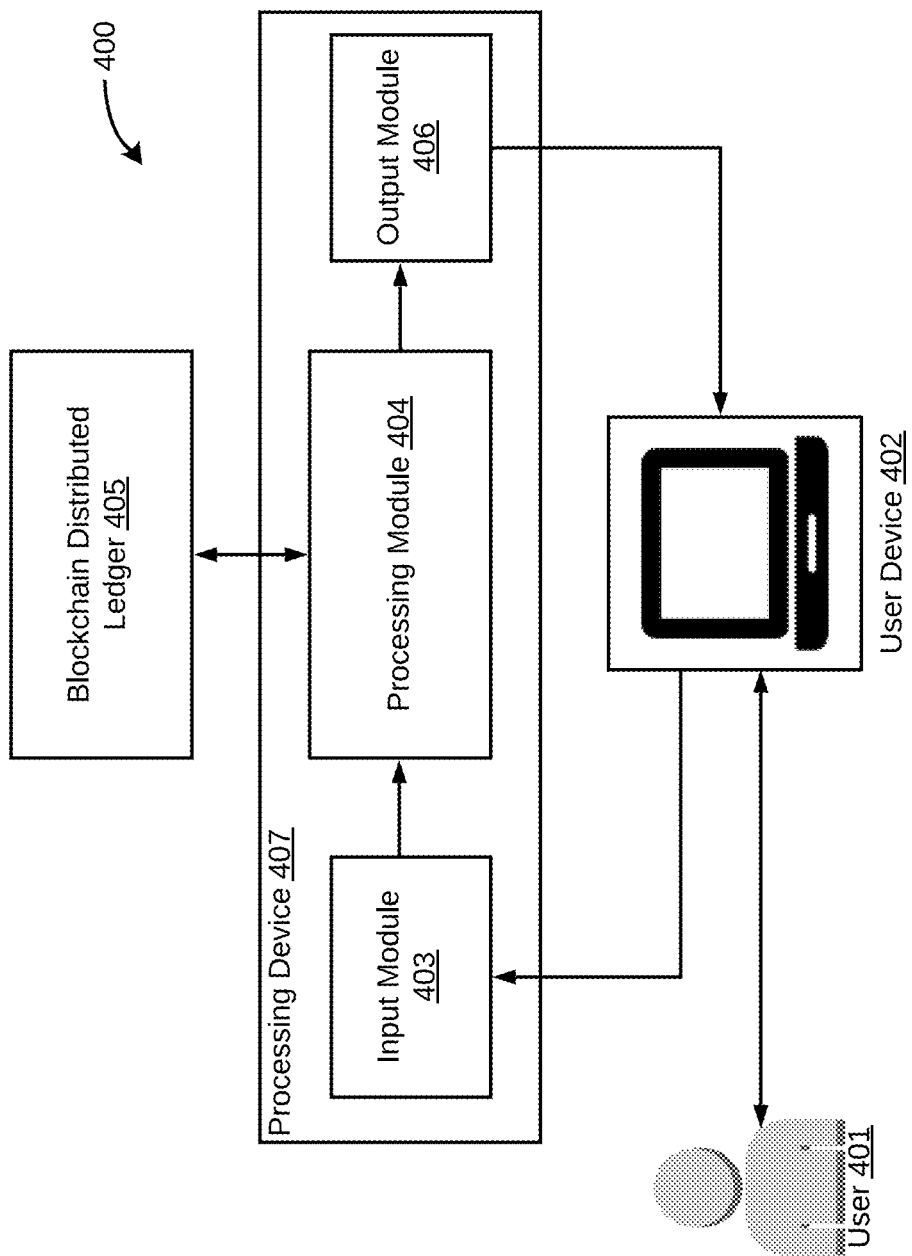
FIG. 4 is a schematic diagram of an exemplary system for facilitating designing of an IoT infrastructure for a new requirement, in accordance with some embodiments of the present disclosure.

Referring now to FIG. 3, an exemplary process 300 for facilitating designing of an IoT infrastructure for deploying an IoT application is depicted via a flow chart in greater detail, in accordance with some embodiments of the present disclosure. Each step of the process 300 may be performed by various modules 105-110 of the processing module 102. Initially, at step 301, a new requirement from a user may be fetched via a user device by the input module 101. It should be noted that fetching the new requirement may include fetching one or more tasks to be performed, amount of dataflow required in the IoT infrastructure, load handling capacity requirement. In some embodiments, the new requirement may be fetched from the user via a phone, a computer device, a laptop, and the like.

At step 302, existing requirements, a plurality of IoT components, and a plurality of IoT designs may be stored in the blockchain distributed ledger 111. In some embodiment, storing the plurality of IoT components may include storing a plurality of device components, a plurality of gateway components, a plurality of cloud components and a plurality of analytic components. Further, a plurality of encryption protocols present in a cryptographic wallet may be used to store the existing requirements, the plurality of IoT components, and the plurality of IoT designs. By employing the encryption protocols, security of the system may be enhanced.

At step 303, a Manhattan distance between each existing requirement corresponding to the new requirement may be computed. The Manhattan distance may be sum of absolute difference between data points across all dimensions of an existing requirement and the new requirement. Initially, both the existing requirement and the new requirement may be converted into numeric values. The Manhattan distance may be then calculated, as per equation (1) given below:

$$\text{Manhattan Distance} = |p_1-q_1| + |p_2-q_2| + \ldots + |p_n-q_n| \quad \text{Equation (1)}$$

where, 'n' represents number of dimensions (e.g., number of tokens), 'p' denotes a data point (e.g., token) corresponding to the existing requirement, and 'q' denotes a data point (e.g., token) corresponding to the new requirement. It should be noted that the Manhattan distance may be preferable distance metrics due to involvement of high dimensional data as a part of the requirements. In other words, there may be 'N' number of texts corresponding to a requirement. Further, when the requirement is converted to numeric data, it may result in more dimensions. Thus, the Manhattan distance calculation is most suitable to find a difference between two high dimensional data. Further, the Manhattan distance may be preferable as it uses absolute value distance that give more robust results. However, it should be noted that, in some embodiments, other distance metrics (e.g., Euclidean distance) may be employed in place of the Manhattan distance to achieve similar objective and to get similar results.

For example, the existing requirement is tokenized that includes tokens 'IoT infrastructure', 'Air Pollution', 'monitoring', and 'detection'. On the other hand, tokens generated for the new requirement may include 'IoT infrastructure', 'Gas leakage' 'monitoring' and 'detection'. Now, to calculate the Manhattan distance each token is converted into a numerical value. Both the existing and new requirements include IoT infrastructure, monitoring, and detection so the numerical value corresponding to each of these tokens may be '1'. For 'Air Pollution', the numerical value in case of existing requirement may be '1', and '0' in case of the new requirement, as the token 'Air Pollution' is only present in the existing requirement. In a similar way, the new requirement, for the token 'Gas leakage', is assigned with a value '1'. And, in case of the existing requirement the numerical value is '0', for the token 'Gas detection'.

Consequently, the data points for the existing requirement are $p_1=1$, $p_2=1$, $p_3=1$, $p_4=1$, and $p_5=0$. The new requirement includes the data points $q_1=1$, $q_2=0$, $q_3=1$, $q_4=1$, and $q_5=1$. Now, as per the given equation (1), the Manhattan distance may be calculated as:

Manhattan Distance=|1−1|+|1−0||+|1−1||+|1−1||+|0−1|=0+1+0+0+1=2

At step 304, the tokenized requirements with minimum difference of the Manhattan distance may be selected. By comparing Manhattan distances of all the tokenized requirements, a minimum Manhattan distance value may be identified. And, one or more of the tokenized requirements having the minimum Manhattan distance value may be selected for further processing. Consider an example that includes five tokenized requirements for example $R_1$, $R_2$, $R_3$, $R_4$, and $R_5$. The Manhattan distances for the five tokenized requirements may be calculated by using the equation (1) and that may result in the Manhattan distances $M_1=2$, $M_2=4$, $M_3=2$, $M_4=3$, and $M_5=4$. Now, the minimum Manhattan distance is $M_2=2$ that is associated with the tokenized requirements $R_1$, and $R_3$. Hence, the prediction module 105 for this example may select the tokenized requirements $R_1$, and $R_3$ from tokenized requirements $R_1$, $R_2$, $R_3$, $R_4$, and $R_5$.

At step 305, tokenized requirements with minimum difference of the Manhattan distance (for example R1 and R3 selected in the previous step) and the new requirement may be converted into respective binary vectors. An attribute '1' in the binary vector may correspond to a presence of a corresponding token. Further, an attribute '0' may correspond to an absence of a corresponding token in the binary vector. It should be noted that a total number of attributes in the binary vector may correspond to a total number of tokens in a union of the one or more corresponding set of tokens.

At step 306, a relevancy score based on the converted minimum difference of the Manhattan distance and the converted new requirement may be calculated. Further, the relevancy score may be calculated based on a cosine similarity between each of the binary vectors of the existing requirement and the binary vector of new requirement. The cosine similarity between two vectors may be calculated, as per equation (2) given below:

$$\text{Cosine Similiarity} = \frac{A \cdot B}{\|A\| * \|B\|} \quad \text{Equation (2)}$$

where, A is the existing requirement and B is the new requirement. It should be noted that the smaller the angel between two vectors, the higher the cosine similarity. Further, it should be noted that the Cosine similarity may be preferable over other similarity metrics because even if the two requirements seems to be very different by other similarity metrics (e.g., Euclidian distance), there are probabilities that they may be still similar. For example, frequent words in the requirements may have higher Euclidian distance than the less frequent words. However, this is not the same with Cosine similarity. Thus, when the similarity has to be calculated for two semantically similar words but with different frequency, then Cosine similarity may be preferred over Euclidian distance.

At step 307, a desired IoT infrastructure may be designed based on the relevancy score. For designing the desired IoT infrastructure, the plurality of IoT design components and the plurality of IoT designs may be selected, corresponding to the new requirement.

Thereafter, at step 308, the blockchain distributed ledger 111 may be updated by storing the identified design of IoT infrastructure in the blockchain distributed ledger 111. It should be noted that the updating module 106 may update the blockchain distributed ledger 111. In some embodiments, a block for updating the blockchain distributed ledger 111 may be created by the block creation module 109. The created block may be then sent to a plurality of nodes over the peer to peer network. Additionally, in some embodiments, the plurality of nodes may be enabled to validate the created block by performing a proof of work. Enabling of the nodes may performed by the block validation module 110. Thereafter, based on performance of the plurality of nodes, one or more of the plurality of nodes may be rewarded. After receiving the rewards from the proof of work, the blockchain distributed ledger 111 may be updated. In some embodiments, the created block may be appended to the blockchain distributed ledger 111 for updating the blockchain distributed ledger 111. It should be noted that a one-way hashing technique may be used to append the created block.

At step 309, the identified design of IoT infrastructure may be provided to the user. The output module 104 may render the identified design of IoT infrastructure to the user via the user device.

By way of an example, referring now to FIGS. 4-8, a system 400 (analogous to the system 100) for designing the IoT infrastructure for a new requirement is illustrated, in accordance with some embodiments of the present disclosure. In the illustrated example, the new requirement may be designing of the IoT infrastructure for deploying an IoT application for gas leakage detection and monitoring. The system 400 includes a user 401, a user device 402, an input module 403 (analogous to the input module 101), a processing module 404 (analogous to the processing module 102), a blockchain distributed ledger 405 (analogous to the blockchain distributed ledger 111), and an output module 406 (analogous to the input module 104). The input module 403, the processing module 404 and the output module 406 may be hosted on a processing device 407. The user 401 may provide the new requirement to the input module 403 through the user device 402. It should be noted that the user device may be a laptop, a computer, a microcontroller, a tablet, a mobile or the like.

Thereafter, the new requirement may be passed through the processing module 404. In some embodiments, the user 401 may provide detailed information about the new requirement in order to design the corresponding IoT infrastructure. The detailed information about the new requirement may include amount of dataflow required by the user with respect to the IoT infrastructure being designed (e.g., for validating gas leakage detection and monitoring). After receiving the detailed information from the input module 403, the processing module 404 may access the historical data in the blockchain distributed ledger 405. The blockchain distributed ledger 405 includes a plurality of IoT designs, and a plurality of IoT components used in past. Thereafter, checks whether the IoT design for validating gas leakage detection and monitoring is already available in the blockchain distributed ledger 405 or not. In some embodiments, when the IoT design is available, the processing module 404 may provide the required IoT design to the user 401.

In case, the IoT design for validating gas leakage detection and monitoring is not available, the processing module 404 may check the plurality of IoT design components in the historical data to identify similar requirements, in accordance with some embodiments of the present disclosure. For example, in some embodiments, for designing IoT infrastructure, the processing module 404 may select the IoT design components that validates the gas leakage detection in the blockchain distributed ledger 405. Based on the selection, the processing module 404 may identify the most relevant IoT design or IoT components that may be further provided to the user 401, via the user device 402. For identifying the most relevant IoT design or IoT components various steps like calculating Manhattan distance, and determining relevancy scores may be performed. These steps are already explained in conjunction to FIGS. 1-3 and will be explained for the aforementioned example of gas detection and monitoring in conjunction with FIGS. 5-8.

Referring now to FIG. 5, a table 500 representing a plurality of existing requirements 501 and corresponding plurality of IoT design components 502-506 is illustrated, in accordance with some embodiments of the present disclosure. For example, a first column 501 of the table 500 represents the existing requirements. And, remaining columns 502-506 of the table 500 represents the corresponding IoT design components for the existing requirements. In the illustrated embodiment, the IoT design components may include a device 502, connectivity 503, gateway 504, cloud 505, and analytics 506. It should be noted that the aforementioned IoT design components are only exemplary and there may be many more design components mapped to each of the existing requirements. In the illustrated embodiment, the first existing requirement is an "IoT infrastructure for air pollution detection, monitoring and alert" and corresponding IoT design components are 'Sensor 1' device, Bluetooth connectivity, Rasperry PI gateway, AWS cloud, and AWS IoT analytics.

Referring now to FIG. 6, a table representing Manhattan distances 603 corresponding to a plurality of existing requirements 601 is illustrated, in accordance with some embodiments of the present disclosure. When the processing module 404 receives a new requirement, for example IoT infrastructure for gas leakage detection and monitoring, the Manhattan distance between all the existing requirements (shown in table 500) corresponding to the new requirement may be calculated. It should be noted that initially tokens for each of the existing requirements of the table 500 may be generated that may be represented by tokenized IoT requirements 601 in the table 600. By the way of an example, for the first existing requirements have tokens as Air, Pollution, Detection, Monitoring, and Alert. Similarly, for other existing requirements tokens are different as shown in FIG. 6. In the illustrated embodiment, the Manhattan distance 603 calculated for the first tokenized requirement with respect to the new requirement may be '2'. It should be noted that the Manhattan distances may be calculated using the equation (1).

Referring now to FIG. 7, a table 700 representing tokenized requirements with minimum Manhattan distance, in accordance with some embodiments of the present disclosure is illustrated. From the table 700, it is clear that total three tokenized existing requirements 701 are selected out of ten tokenized requirements. These four tokenized existing requirements 701 may be selected by the processing module 404 based on the minimum Manhattan distance. It is clearly seen in the table 600 that the minimum Manhattan distance 2 out of three different Manhattan distances 2, 3, and 4. The tokenized requirements associated with the minimum Manhattan distance 2 are first, fifth, and eighth tokenized requirements. Also, the new requirement 702 with tokens and device component may also be included in a last row of the table 700

Referring now to FIG. 8, a table 800 representing binary vectors corresponding to each tokenized requirement is illustrated, in accordance with some embodiments of the present disclosure. Existing requirements 801 may include REQ1, REQ2, and REQ3. For each of the existing requirements 801 and the new requirement 802 a binary vector may be calculated. To calculate a binary vector, each token is considered. An attribute '1' for the presence of a corresponding token. Further, '0' is for an absence of the corresponding token, as shown in the table 800. Based on the table 800 the processing device may calculate relevancy scores.

For example, in the table 800, REQ4 may be mapped with REQ1, REQ2 and REQ3 to find out the relevancy scores. Firstly, for cosine similarity the equation (2) may be referred, and in the equation 'A' is the REQ1 and 'B' is the REQ4. Then, a relevancy score of cosine similarity may be [REQ1: REQ4] Cosine Similarity=3/(SQRT (6)*SQRT (5)) =0.548. Similarly, when REQ2 and REQ3 are mapped with REQ4, the obtained relevancy scores may be 0.89 and 0.6708, respectively. It is clearly seen that the relevancy score of REQ2 is maximum corresponding to the new requirement REQ4. Hence, the REQ2 may be selected for designing the new requirement of gas detection and monitoring.

The present disclosure may provide many advantages in order to overcome the problems encountered in conventional systems and methods. As discussed above, the present disclosure uses cryptographic wallets that may enable the users to access blockchain technology-based database, peer-to-peer network, securely, to facilitate IoT component processing. As the blockchain technology is used, the historical data may be maintained automatically in the database with regular updates, which reduces manual efforts. Additionally, the systems and methods described in the present disclosure may provide accurate analysis that may help various organizations to predict trends in the market and to plan a successful implementation. Performance issues existing in the conventional systems and methods may also be overcome by the present disclosure, effectively by providing high IoT response time. Moreover, the disclosure provides, a real time smart analytics that may help engineers to find out irregularities in collected data and act fast to prevent an undesired scenario, and a predictable level of service with improved ownership and accountability.

Figure 9:
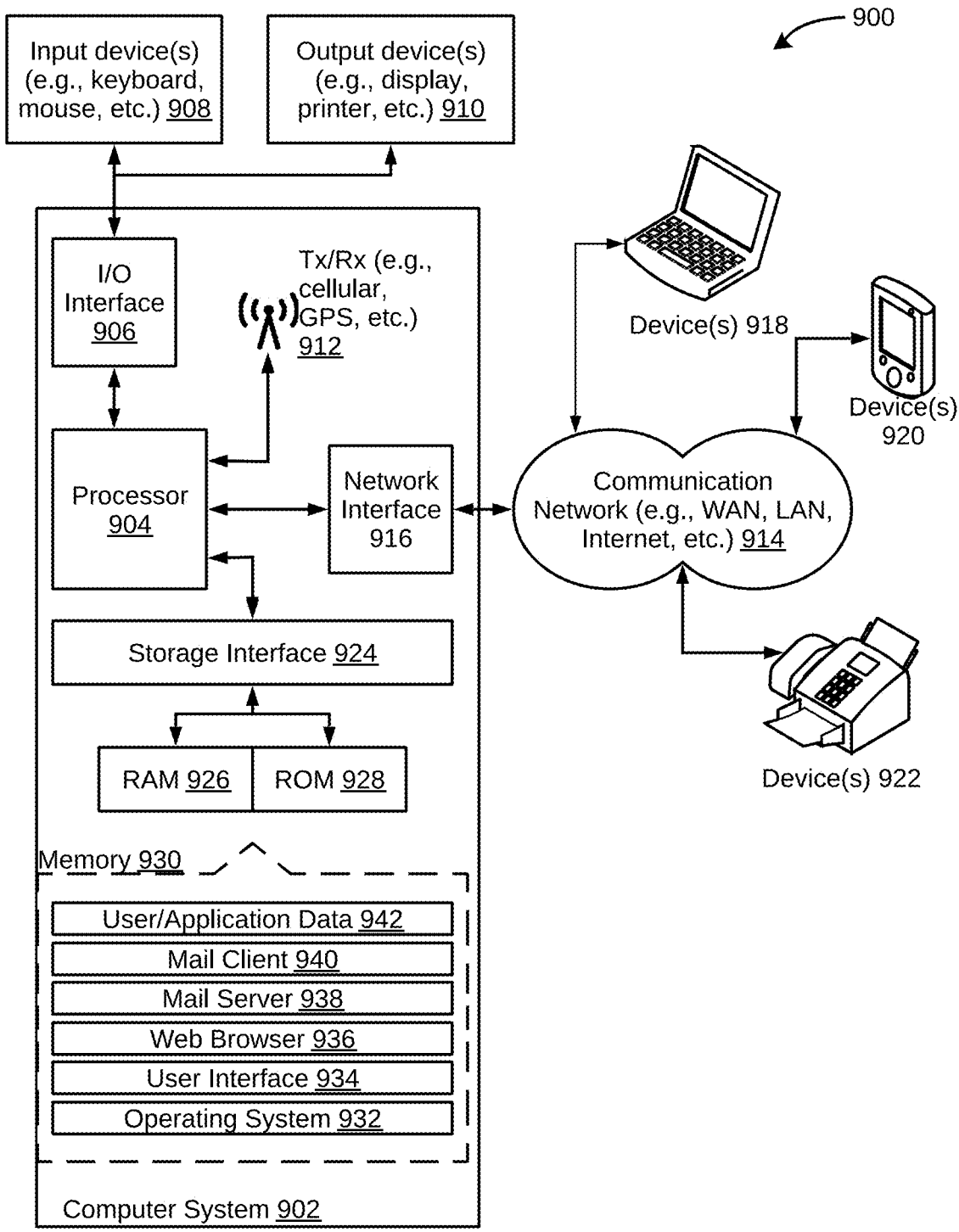
FIG. 9 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 9, a block diagram of an exemplary computer system 902 for implementing various embodiments is illustrated. Computer system 902 may include a central processing unit ("CPU" or "processor") 904. Processor 904 may include at least one data processor for executing program components for executing user-generated or system-generated requests. A user may include a person, a person using a device such as such as those included in this disclosure, or such a device itself. Processor 904 may include specialized processing units. Such as integrated system (bus) controllers, memory management control units, floating point units, graphics processing units, digital signal processing units, etc. Processor 904 may include a microprocessor, such as AMD® ATHLON® microprocessor, DURON® microprocessor or OPTERON® microprocessor, ARM's application, embedded or secure processors, IBM® POWERPC®, INTEL'S CORE® processor, ITANIUM® processor, XEON® processor, CELERON® processor or other line of processors, etc. Processor 904 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 904 may be disposed in communication with one or more input/output (I/O) devices via an I/O interface 906. I/O interface 906 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 906, computer system 902 may communicate with one or more I/O devices. For example, an input device 908 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 910 may be a printer, fax machine, video display (for example, cathode ray tube (CRT), liquid crystal display (LCD), light-emitting diode (LED), plasma, or the like), audio speaker, etc. In some embodiments, a transceiver 912 may be disposed in connection with processor 904. Transceiver 912 may facilitate various types of wireless transmission or reception. For example, transceiver 912 may include an antenna operatively connected to a transceiver chip (for example, TEXAS INSTRUMENTS® WILINK WL1283® transceiver, BROADCOM® BCM4750IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 904 may be disposed in communication with a communication network 914 via a network interface 916. Network interface 916 may communicate with communication network 914. Network interface 916 may employ connection protocols including, without limitation, direct connect, Ethernet (for example, twisted pair 100/100/1000 Base T), transmission control protocol/internet protocol (TCP/IP), token ring, IEEE 802.11a/b/g/n/x, etc. Communication network 914 may include, without limitation, a direct interconnection, local area network (LAN), wide area network (WAN), wireless network (for example, using Wireless Application Protocol), the Internet, etc. Using network interface 916 and communication network 914, computer system 902 may communicate with devices 918, 920, and 922. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® e-reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 902 may itself embody one or more of these devices.

In some embodiments, processor 904 may be disposed in communication with one or more memory devices (for example, RAM 926, ROM 928, etc.) via a storage interface 924. Storage interface 924 may connect to memory 930 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 930 may store a collection of program or database components, including, without limitation, an operating system 932, user interface application 934, web browser 936, mail server 938, mail client 940, user/application data 942 (for example, any data variables or data records discussed in this disclosure), etc. Operating system 932 may facilitate resource management and operation of computer system 902. Examples of operating systems 932 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 934 may facilitate display, execution, interaction, manipulation, or operation of program components through textual or graphical facilities. For example, user interfaces may provide computer interaction interface elements on a display system operatively connected to computer system 902, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 902 may implement a web browser 936 stored program component. Web browser 936 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 902 may implement a mail server 938 stored program component. Mail server 938 may be an Internet mail server such as MICROSOFT® EXCHANGE® mail server, or the like. Mail server 938 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 938 may utilize communication protocols such as internet message access protocol (IMAP), messaging application programming interface (MAPI), Microsoft Exchange, post office protocol (POP), simple mail transfer protocol (SMTP), or the like. In some embodiments, computer system 902 may implement a mail client 940 stored program component. Mail client 940 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 902 may store user/application data 942, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POEr-object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The specification has described method and system for facilitating designing of an IoT infrastructure for deploying an IoT application. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. Bur discloses, a method of facilitating designing of an Internet of Things (IoT) infrastructure for deploying an IoT application (Bur, Abstract, FIG. 1a), the method comprising:
   determining, by a processing device, a Manhattan distance between each of a plurality of existing requirements and a new requirement, wherein the new requirement is with respect to the IoT infrastructure for deploying the IoT application;
   identifying, by the processing device, one or more of the plurality of existing requirements corresponding to a minimum Manhattan distance;
   determining, by the processing device, a relevancy score for each of the one or more identified existing requirements based on a similarity between the each of the one or more identified existing requirements and the new requirement;
   providing, by the processing device, one or more IoT components and one or more IoT designs corresponding to a similar existing requirement for facilitating designing of the IoT infrastructure, wherein the similar existing requirement comprises one or more identified existing requirement with a maximum relevancy score,
   wherein determining the Manhattan distance comprises:
   tokenizing each of the plurality of existing requirements and the new requirement into a corresponding set of tokens; and
   determining the Manhattan distance between each of the plurality of existing requirements and the new requirement based on a difference between the corresponding set of tokens for each of the plurality of existing requirements and the corresponding set of tokens for the new requirement.

2. The method of claim 1, further comprising receiving the new requirement from a user or a system, wherein the new requirement comprises at least one of a task to be performed, an amount of dataflow required, and a load handling capacity required.

3. The method of claim 1, further comprising retrieving the plurality of existing requirements from a database, wherein the database comprises a blockchain distributed ledger, wherein each of the plurality of existing requirement is retrieved along with one or more corresponding IoT components and one or more corresponding IoT designs, and wherein the plurality of existing requirements correspond to the new requirement.

4. The method of claim 3, further comprising updating the database by storing the new requirement, the one or more IoT components, and the one or more IoT designs for subsequent use.

5. The method of claim 1, wherein determining the relevancy score comprises:
   converting each of the one or more identified existing requirements and the new requirement into respective binary vectors, wherein an attribute of 1 in a binary vector corresponds to a presence of a corresponding token, and wherein a total number of attributes in the binary vector correspond to a total number of tokens in a union of the one or more corresponding set of tokens; and determining the relevancy score for the each of the one or more identified existing requirements with respect to the new requirement based on a cosine similarity between the respective binary vectors.

6. A system for facilitating designing of an Internet of Things (IoT) infrastructure for deploying an IoT application, the system comprising:

a processor; and a memory communicatively coupled to the processor, wherein the memory stores processor-executable instructions, which, on execution, causes the processor to:

determine a Manhattan distance between each of a plurality of existing requirements and a new requirement, wherein the new requirement is with respect to the IoT infrastructure for deploying the IoT application;

identify one or more of the plurality of existing requirements corresponding to a minimum Manhattan distance;

determine a relevancy score for each of the one or more identified existing requirements based on a similarity between the each of the one or more identified existing requirements and the new requirement;

provide one or more IoT components and one or more IoT designs corresponding to a similar existing requirement for facilitating designing of the IoT infrastructure, wherein the similar existing requirement comprises one of the one or more identified existing requirement with a maximum relevancy score, wherein the processor determines the Manhattan distance by:

tokenizing each of the plurality of existing requirements and the new requirement into a corresponding set of tokens; and determining the Manhattan distance between each of the plurality of existing requirements and the new requirement based on a difference between the corresponding set of tokens for each of the plurality of existing requirements and the corresponding set of tokens for the new requirement.

7. The system of claim 6, wherein the processor-executable instructions further cause the processor to receive the new requirement from a user or a system, wherein the new requirement comprises at least one of a task to be performed, an amount of dataflow required, and a load handling capacity required.

8. The system of claim 6, wherein the processor-executable instructions further cause the processor to retrieve the plurality of existing requirements from a database, wherein the database comprises a blockchain distributed ledger, wherein each of the plurality of existing requirement is retrieved along with one or more corresponding IoT components and one or more corresponding IoT designs, and wherein the plurality of existing requirements correspond to the new requirement.

9. The system of claim 8, wherein the processor-executable instructions further cause the processor to update the database by storing the new requirement, the one or more IoT components, and the one or more IoT designs for subsequent use.

10. The system of claim 6, wherein the processor determines the relevancy score by:

converting each of the one or more identified existing requirements and the new requirement into respective binary vectors, wherein an attribute of 1 in a binary vector corresponds to a presence of a corresponding token, and wherein a total number of attributes in the binary vector correspond to a total number of tokens in a union of the one or more corresponding set of tokens; and determining the relevancy score for the each of the one or more identified existing requirements with respect to the new requirement based on a cosine similarity between the respective binary vectors.

11. A non-transitory computer-readable medium having stored thereon a set of computer-executable instructions for facilitating designing of an Internet of Things (IoT) infrastructure for deploying an IoT application, the set of computer-executable instructions causing a computer comprising one or more processors to perform steps comprising:

determining a Manhattan distance between each of a plurality of existing requirements and a new requirement, wherein the new requirement is with respect to the IoT infrastructure for deploying the IoT application;

identifying one or more of the plurality of existing requirements corresponding to a minimum Manhattan distance;

determining a relevancy score for each of the one or more identified existing requirements based on a similarity between the each of the one or more identified existing requirements and the new requirement;

providing one or more IoT components and one or more IoT designs corresponding to a similar existing requirement for facilitating designing of the IoT infrastructure, wherein the similar existing requirement comprises one of the one or more identified existing requirement with a maximum relevancy score, wherein determining the Manhattan distance comprises:

tokenizing each of the plurality of existing requirements and the new requirement into a corresponding set of tokens; and determining the Manhattan distance between each of the plurality of existing requirements and the new requirement based on a difference between the corresponding set of tokens for each of the plurality of existing requirements and the corresponding set of tokens for the new requirement.

12. The non-transitory computer-readable medium of claim 11, wherein the steps further comprise receiving the new requirement from a user or a system, wherein the new requirement comprises at least one of a task to be performed, an amount of dataflow required, and a load handling capacity required.

13. The non-transitory computer-readable medium of claim 11, wherein the steps further comprise retrieving the plurality of existing requirements from a database, wherein the database comprises a blockchain distributed ledger, wherein each of the plurality of existing requirement is retrieved along with one or more corresponding IoT components and one or more corresponding IoT designs, and wherein the plurality of existing requirements correspond to the new requirement.

14. The non-transitory computer-readable medium of claim 13, wherein the steps further comprise updating a database by storing the new requirement, the one or more IoT components, and the one or more IoT designs for subsequent use.

15. The non-transitory computer-readable medium of claim 11, wherein determining the relevancy score comprises:
- converting each of the one or more identified existing requirements and the new requirement into respective binary vectors, wherein an attribute of 1 in a binary vector corresponds to a presence of a corresponding token, and wherein a total number of attributes in the binary vector correspond to a total number of tokens in a union of the one or more corresponding set of tokens; and
- determining the relevancy score for the each of the one or more identified existing requirements with respect to the new requirement based on a cosine similarity between the respective binary vectors.

* * * * *